(12) United States Patent
Hashizume

(10) Patent No.: US 10,608,325 B2
(45) Date of Patent: Mar. 31, 2020

(54) ELECTRONIC DEVICE

(71) Applicant: KYOCERA Corporation, Kyoto (JP)

(72) Inventor: Takanori Hashizume, Machida (JP)

(73) Assignee: KYOCERA Corporation, Kyoto (JP)

(*) Notice: Subject to any disclaimer, the term of this patent is extended or adjusted under 35 U.S.C. 154(b) by 0 days.

(21) Appl. No.: 15/985,059

(22) Filed: May 21, 2018

(65) Prior Publication Data

US 2018/0342792 A1 Nov. 29, 2018

(30) Foreign Application Priority Data

May 25, 2017 (JP) .................. 2017-103248

(51) Int. Cl.
H01Q 1/24 (2006.01)
G02F 1/1333 (2006.01)
H01Q 9/42 (2006.01)
H01Q 21/28 (2006.01)
H01Q 13/10 (2006.01)

(52) U.S. Cl.
CPC ....... H01Q 1/243 (2013.01); G02F 1/133308 (2013.01); H01Q 9/42 (2013.01); H01Q 13/10 (2013.01); H01Q 21/28 (2013.01); G02F 2001/133314 (2013.01); G02F 2001/133317 (2013.01)

(58) Field of Classification Search
CPC .......... H01Q 1/243; H01Q 9/42; H01Q 13/10; H01Q 21/28; H01Q 1/24; G02F 1/133308; G02F 2001/133314; G02F 2001/133317; G02F 1/1333
USPC .......................................... 343/702
See application file for complete search history.

(56) References Cited

U.S. PATENT DOCUMENTS

2011/0273342 A1* 11/2011 Park ............ H01Q 1/243
343/702
2017/0054196 A1* 2/2017 Hu ............. H01Q 1/243

FOREIGN PATENT DOCUMENTS

JP 2015-122657 A 7/2015

* cited by examiner

Primary Examiner — Hai V Tran
(74) Attorney, Agent, or Firm — Studebaker & Brackett PC

(57) ABSTRACT

In order to further improve the communication quality, the electronic device (10) according to this disclosure includes the antenna (17) disposed on the case back (15) provided at the back side of the device, the display (11) provided on the front side of the device and the sheet metal member (12) that is provided at the front side of the device and is configured to protect the display (11). The sheet metal member (12) has a notch (121) extending in a specific direction, and the notch (121) divides the sheet metal member (12) into the external part (12A) and the internal part (12B) of the notch in the direction intersecting with a specific direction, and the external part (12A) functions as the antenna (18).

3 Claims, 5 Drawing Sheets

ELECTRONIC DEVICE

CROSS-REFERENCE TO RELATED APPLICATION

This application claims priority of Japanese Patent Application No. 2017-103248 filed in Japan on May 25, 2017, the entire disclosure of which is incorporated into this application for reference.

TECHNICAL FIELD

This disclosure relates to an electronic device that includes a plurality of antennas.

REARGROUND

In recent years, there has been a growing number of antennas mounted on an electronic device such as a smartphone, a mobile phone and a tablet terminal to correspond to a plurality of communication systems such as Long Term Evolution (LTE), Wideband Code Division Multiple Access (WCDMA®) and Global System for Mobile communications (GSM®) (WCDMA and GSM are each a registered trademark in Japan, other countries, or both) or to Multiple-Input and Multiple-Output (MIMO) configured to receive signals by a plurality of antennas.

SUMMARY

Solution to Problem

An electronic device according to an aspect of this disclosure includes a first antenna disposed on a case provided at the back side of the electronic device, a display provided at a front side of the electronic device and a sheet metal member provided at the front side of the electronic device and configured to protect the display. The sheet metal member is provided with a notch extending in a specific direction. The notch divides the sheet metal member into an external part of the notch and an internal part of the notch in the direction intersecting with the specific direction, and the external part functions as a second antenna.

DETAILED DESCRIPTION

An embodiment of this disclosure is described below with reference to the drawings. It should be noted that the same reference signs in each drawing indicate the same or similar components.

In the aforementioned electronic device that includes a plurality of antennas, further improvement of the communication quality is desired.

Accounting for these considerations, it would be helpful to provide an electronic device that can further improve the communication quality.

According to this disclosure, an electronic device that can further improve the communication quality can be provided.

Figure 1:
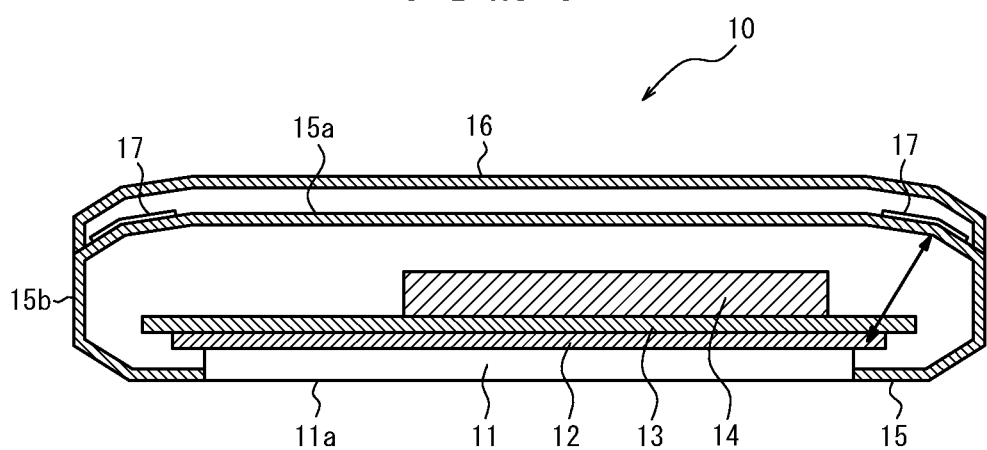
FIG. 1 is a cross-sectional view illustrating a configuration of a main part of an electronic device according to an embodiment of this disclosure.

FIG. 1 is a cross-sectional view illustrating a configuration of a main part of an electronic device 10 according to an embodiment of this disclosure. The electronic device 10 according to this embodiment is an electronic device such as a smartphone, a mobile phone, a tablet terminal, a vehicle mounted communication device and Internet of Things (IoT), and communicates wirelessly with the other communication device (e.g. a base station) not shown. FIG. 1 illustrates only antennas configured to communicate wirelessly with other communication devices and a configuration related thereto in the electronic device 10, and a configuration to achieve various functions of the electronic device 10 is omitted.

As aforementioned, an electronic device is required to mount a large number of antennas. Thus, a certain space is required to be provided between antennas to suppress degradation of the communication performance due to interference between antennas. On the other hand, miniaturization of electronic device is required. Thus, it is difficult to provide a number of antennas in a limited space of the housing of electronic device while keeping a distance between antennas. In this embodiment, a solution is provided to the aforementioned problem, and even if a plurality of antennas are provided, each distance between antennas is kept to improve the communication quality.

The electronic device 10 illustrated in FIG. 1 includes a display 11, a sheet metal member 12, a substrate 13, a battery 14, a case back 15 and a rear panel 16.

The display 11 is composed of an Liquid Crystal Display (LCD) panel, for example, and displays various images on a display surface 11a. Hereinafter the side of the display surface 11a of the display 11 is referred to as a front side of the electronic device 10 and the side opposite to the display surface 11a of the electronic device 10 is referred to as a back side.

The sheet metal member 12 is provided in contact with or adjacent to the display 11 at the opposite side of the display surface 11a of the display 11. The sheet metal member 12 is a metallic plate-like member provided to protect the display 11. In general, the display 11 is rectangular, and the sheet metal member 12 is also rectangular in accordance with the shape of the display 11.

The substrate 13 is provided at the opposite side of the display 11 of the sheet metal member 12. Various electronic components for operating the electronic device 10 are mounted on the substrate 13.

The battery 14 supplies power of driving the electronic device 10 to each part in the electronic device 10.

The case back 15 is provided at the back side of the electronic device 10, and is used to ensure the rigidity of the electronic device 10 and to hold each part (e.g. the display 11) in the electronic device 10. The case back 15 is composed of any material such as plastic or synthetic resin having an appropriate rigidity as an internal structure of the electronic device 10. In the example illustrated in FIG. 1, the case back 15 has a case-like shape formed by a bottom surface 15a and a side surface 15b. The case back 15 stores the display 11, the sheet metal member 12, the substrate 13 and the battery 14 in the internal space formed by the bottom surface 15a and the side surface 15b. Here, the case back 15 stores the display 11 in the internal space while exposing the display surface 11a of the display 11. The shape of the case back 15 illustrated in FIG. 1 is merely an example, and various shapes are available according to various conditions such as a configuration of each part of the electronic device 10. To sum up, the case back 15 is provided at the back side of the electronic device 10, and has various configurations for ensuring rigidity of the electronic device 10 and for holding each part in the electronic device 10.

The rear panel 16 is mounted on the electronic device 10 such that it covers the bottom surface 15a of the case back 15 from behind.

The display surface 11a of the display 11 corresponds to the front surface of the electronic device 10. Further, the sheet metal member 12 is provided being in contact with or adjacent to the display 11. In other words, the display 11 and the sheet metal member 12 are provided at the front side of the electronic device 10. On the other hand, the case back 15 is provided at the back side of the electronic device 10. Therefore, the electronic device 10 includes the display 11 and the sheet metal member 12 provided at the front side of the electronic device 10 and the case back 15 (case) provided at the back side of the electronic device 10.

In the electronic device 10, antenna forming positions include the back side of the case back 15. Specifically, as illustrated in FIG. 1, an antenna 17 is formed on the back side of the case back 15. An example of forming the antenna 17 on the case back 15 is described in more detail with reference to FIG. 2.

Figure 2:
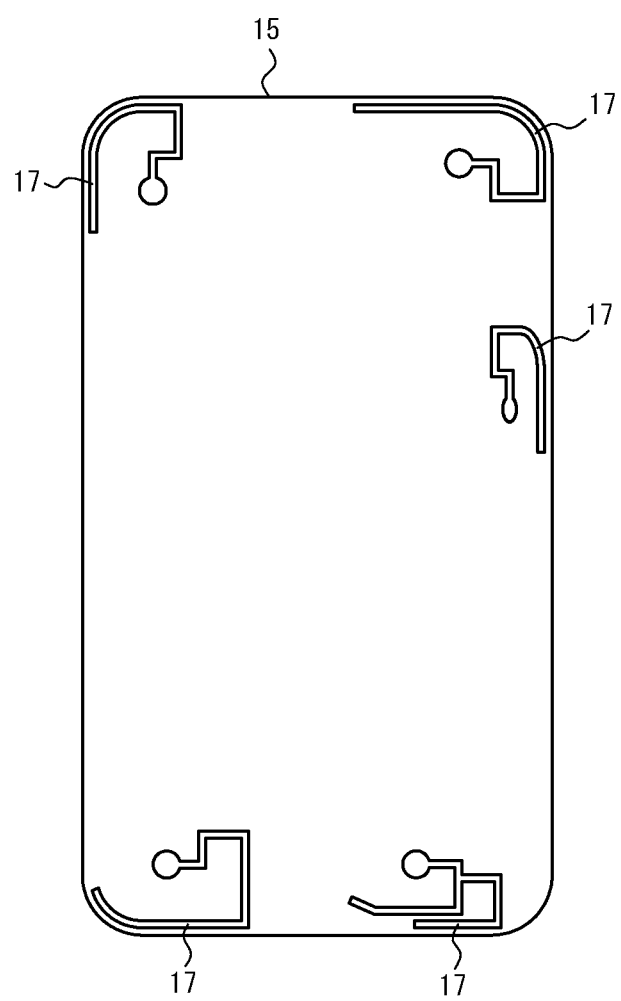
FIG. 2 is a plan view of a case back illustrated in FIG. 1 viewed from the back side.

FIG. 2 is a plan view of the case back 15 viewed from the back side.

As illustrated in FIG. 2, one or a plurality of antennas 17 (first antennas) are formed on the case back 15 by printing of a conductor. FIG. 2 illustrates an example in which five antennas 17 are formed. When metal is present around the antennas 17, radiation from the antennas is suppressed, and the communication characteristics are degraded. Further, when a distance between antennas is close, the communication characteristics are degraded due to interference. Thus, it is not always the case that each antenna 17 can be disposed on any position of the case back 15, and each antenna 17 is disposed on a position apart from the metal (e.g. the battery 14) and from other antennas in the electronic device 10 as much as possible. For example, as illustrated in FIG. 2, in a plane view, the antenna 17 is disposed on four corners of the case back 15, or in the vicinity of the outer edge. Thus, position where the antenna 17 is disposed is limited, and it is difficult to form all of the antennas required for the electronic device 10 on the case back 15.

Thus, in this embodiment, a part of the sheet metal member 12 is used as an antenna. Formation of antennas on the sheet metal member 12 is described with reference to FIG. 3.

Figure 3:
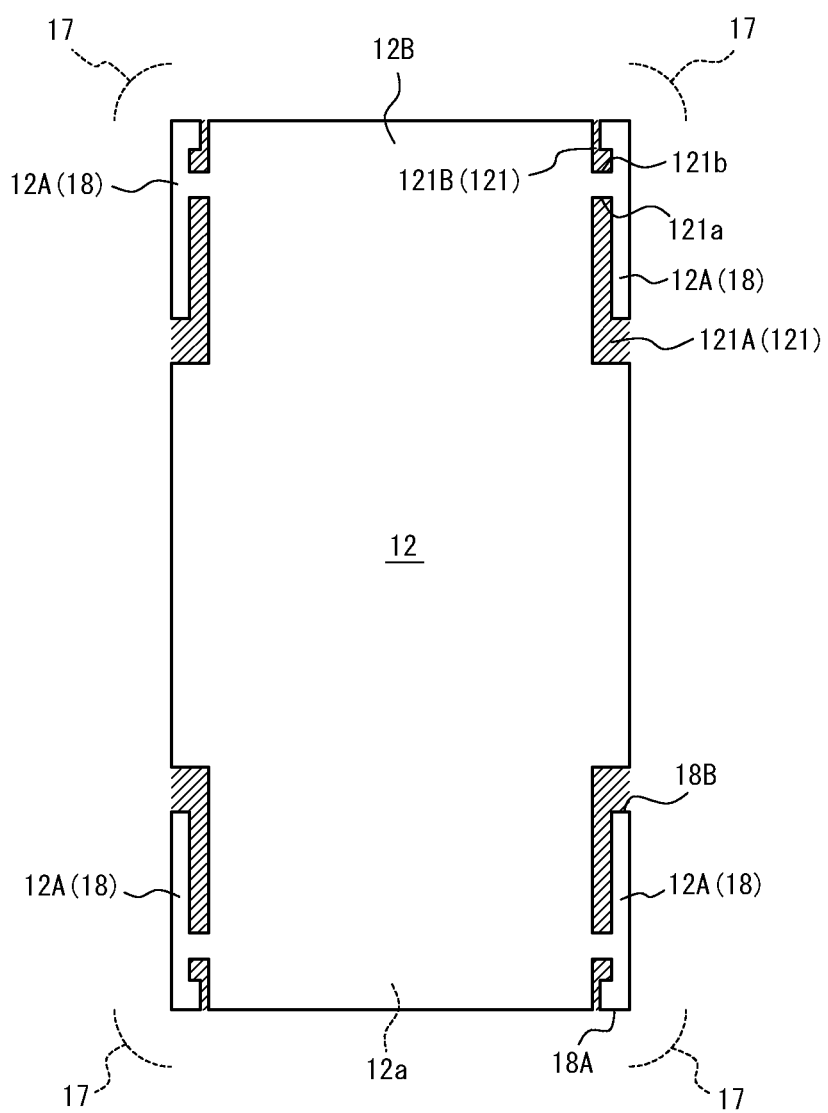
FIG. 3 is a plan view illustrating an example of a configuration of a sheet metal member illustrated in FIG. 1.

FIG. 3 is a plan view illustrating an example of a configuration of the sheet metal member 12. In FIG. 3, for convenience of explanation, a rectangular sheet metal 12a having the same length direction and the width direction in size as those of the sheet metal member 12 is virtually superimposed on the sheet metal member 12. Further, in FIG. 3, for convenience of explanation, each antenna 17 formed on the case back 15 is virtually illustrated with dashed lines. As illustrated with reference to FIG. 2, the antenna 17 is provided on four corners of the case back 15. Further, as illustrated with reference to FIG. 1, the case back 15 stores the sheet metal member 12 such that it surrounds the sheet metal member 12. Therefore, as illustrated in FIG. 3, in a plane view, each antenna 17 is located outside of the sheet metal member 12.

The sheet metal member 12 has a configuration in which a notch 121 passing through in the thickness direction of the sheet metal 12a is formed in the vicinity of each vertex of the rectangular sheet metals 12a. A description of the details of the notch 121 is given below by focusing on one vertex (a specific vertex) formed by one long side and one short side of the sheet metal 12a. The notch 121 includes a notch 121A and a notch 121B. In FIG. 3, each area formed by the notch 121A and the notch 121B is indicated with hatched lines.

As illustrated in FIG. 3, on a long side forming a specific vertex of the sheet metal 12a, the notch 121A extends from a position apart from the specific vertex by a specific distance toward a facing long side. Further, the notch 121A bends at a position away from the long side forming the specific vertex by a specific distance toward a short side forming the specific vertex and extends along the long side over a specific distance. The notch 121B extends from the short side forming the specific vertex toward a facing short side by a specific distance.

The position of the short side direction (the direction along the short side) at which the notch 121A bends approximately matches the position in the short side direction at which the notch 121B is formed. Further, the notch 121A and the notch 121B are not connected with each other, and the end 121a of the notch 121A in the long side direction (the direction along the long side) and the end 121b of the notch 121B in the long side direction face each other across a specific distance.

An external part 12A that includes a vertex of the sheet metal 12a and extends in the long side direction is formed on the sheet metal member 12 by formation of the notch 121 (the notch 121A and the notch 121B). Further, by formation of the notch 121, an internal part 12B that is connected to the external part 12A through a part that is sandwiched between the end 121a of the notch 121A and the end 121b of the notch 121B is formed in the sheet metal member 12. In other words, the sheet metal member 12 is divided into the external part 12A located outside of the notch 121 and the internal part 12B located inside of the notch 121 (the side including the center line in the short side direction) in the short side direction (the direction intersecting with a specific direction) by the notch 121 extending in the long side direction (a specific direction).

As aforementioned, the notch 121 (the notch 121A and the notch 121B) is formed in the vicinity of each of four vertexes of the rectangular sheet metal 12a. Therefore, as illustrated in FIG. 3, the external part 12A divided by the notch 121 is formed on each of four corners of the sheet metal member 12.

In this embodiment, the external part 12A extending in the long side direction of the sheet metal member 12 functions as an antenna 18 (a second antenna). Specifically, one end 18A (end on the vertex side of the sheet metal 12a) in the long side direction of the external part 12A is defined as a feeding point and the other end 18B in the long side direction of the external part 12A is defined as a radiation end. In this manner, the external part 12A of the sheet metal member 12 is allowed to function as the antenna 18.

The sheet metal member 12 is provided at the front side of the electronic device 10. Further, the case back 15 is provided at the back side of the electronic device 10. In other words, the sheet metal member 12 and the case back 15 are disposed across a certain distance. Therefore, as illustrated in FIG. 1, the antenna 18 provided on the sheet metal member 12 and the antenna 17 provided on the case back 15 can be disposed across a distance enough for suppressing generation of interference by allowing a part of the sheet metal member 12 to function as the antenna 18.

As aforementioned, the notch 121 (the notch 121A and the notch 121B) is formed in the vicinity of each of four vertexes of the rectangular sheet metal 12a, and as illustrated in FIG. 3, the external part 12A divided by the notch 121 is formed on each of four corners of the sheet metal member 12. Therefore, four antennas 18 can be formed on the sheet metal member 12. The notch 121 is formed such that the external part 12A of the sheet metal member 12 functioning as the antenna 18 is formed to correspond to the frequency band in which the antenna 18 receives/transmits signals.

In FIG. 3, although a description has been given by using an example in which one end 18A in the long side direction of the external part 12A of the sheet metal member 12 is defined as a feeding point and the other end 18B in the long side direction of the external part 12A is defined as a radiation end, it is not limited thereto. The one end 18A in the long side direction of the external part 12A may be defined as a radiation end and the other end 18B in the long side direction of the external part 12A may be defined as a feeding point. However, it is desirable that the radiation end of the antenna 18 be apart from the other antenna as much as possible. Therefore, as illustrated in FIG. 3, when the antenna 17 is disposed on four corners of the sheet metal member 12, it is desirable that one end 18A in the long side direction of the external part 12A be defined as a feeding point and the other end 18B in the long side direction of the external part 12A be defined as a radiation end.

Figure 4:
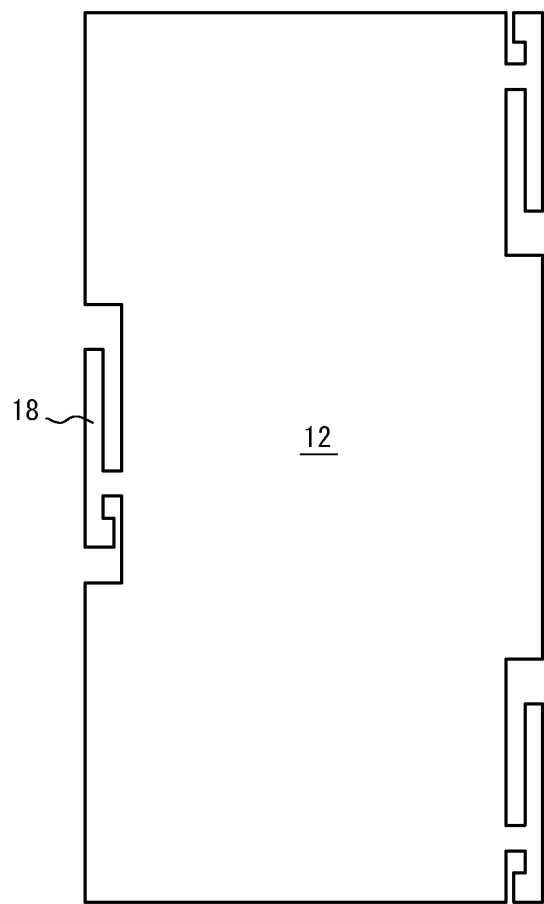
FIG. 4 is a plan view illustrating another example of a configuration of the sheet metal member illustrated in FIG. 1.

Further, in FIG. 3, although a description has been given by using an example in which the antenna 18 is formed on four corners of the sheet metal member 12, it is not limited thereto. For example, as illustrated in FIG. 4, the antenna 18 may be formed at the center or in the vicinity of the long side of the sheet metal member 12. However, in general, wiring is not concentrated in the vicinity of the end of the substrate 13 compared with the central part thereof. Thus, influence by the wiring on the substrate 13 is reduced by providing the antenna 18 on four corners of the sheet metal member 12 close to the end of the substrate 13, and the communication performance can be improved.

Further, in FIGS. 3 and 4, although a description has been given by using an example in which the sheet metal member 12 is plane, it is not limited thereto. A part of the sheet metal member 12 may be bent toward the display 11 such that the sheet metal member 12 surrounds the display 11.

Figure 5:
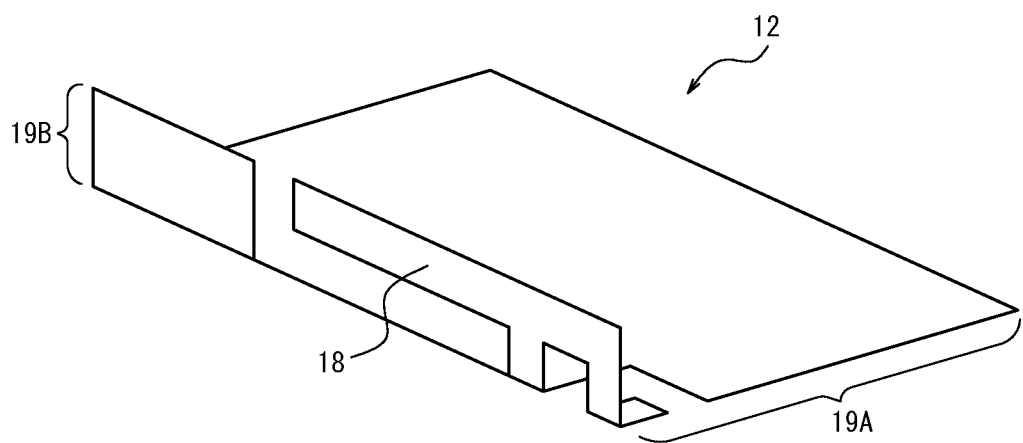
FIG. 5 is a perspective view illustrating yet another example of a configuration of the sheet metal member illustrated in FIG. 1.

FIG. 5 illustrates a configuration example of the antenna 18 in the case where a part of the sheet metal member 12 is bent toward the display 11.

As illustrated in FIG. 5, a surface 19A (a first surface) being in parallel with the display surface 11a of the display 11 and a surface 19B (a second surface) bent from the surface 19A toward the display surface 11a of the display 11 is formed by bending a part of the sheet metal member 12. Further, the antenna 18 is formed on the surface 19B by providing a notch on the surface 19A and the surface 19B.

A radiation surface of the antenna 18 formed on the surface 19A and a radiation surface of the antenna 17 formed on the case back 15 are different from a radiation surface of the antenna 18 formed on the surface 19B bent form the surface 19 A. As a result of this, the interference between the antenna 18 formed on the surface 19A or the antenna 17 formed on the case back 15 and the antenna 18 formed on the surface 19B is reduced, and the communication perfor-mance can be improved. Further, the display 11 can be protected in more positive manner by bending a part of the sheet metal member 12 toward the display 11 such that the sheet metal member 12 surrounds the display 11.

It should be noted that disposition of the antennas 17 and 18 is not limited to the aforementioned examples. The antennas 17 and 18 may be disposed appropriately in consideration of the number of antennas required to be mounted on the electronic device 10, the frequency band in which each antenna receives/transmits signals, the distance between antennas, and the like. For example, antennas that transmit/receive signals in the same frequency band are disposed as apart as possible from each other.

As aforementioned, in this embodiment, the electronic device 10 includes the antenna 17 (the first antenna) disposed on the case back 15 (case) provided at the back side of the electronic device 10, the display 11 provided at the front side of the device and the sheet metal member 12 that is provided at the front side of the electronic device 10 and is configured to protect the display 11. The notch 121 extending in a specific direction is provided in the sheet metal member 12. The sheet metal member 12 is divided into the external part 12A of the notch 121 and the internal part 12B of the notch 121 by the notch 121 in the direction intersecting the specific direction. Then the external part 12A functions as the antenna 18 (the second antenna).

An enough space can be provided between the antenna 18 and the antenna 17 provided on the case back 15 that is disposed on the back side of the electronic device 10 by allowing a part of the sheet metal member 12 (the external part 12A divided by the notch 121) provided on the front surface of the electronic device 10 to function as the antenna 18. Thus, the interference between the antennas is reduced and the communication quality can be improved.

Further, in general, the sheet metal member 12 is disposed to protect the display 11. The number of antennas mounted on the electronic device 10 can be increased without causing an increase in volume of the electronic device 10 and an increase in cost by allowing a part of the sheet metal member 12 to function as the antenna 18. Further, the space in which an antenna can be disposed is increased in the electronic device 10 by allowing a part of the sheet metal member 12 to function as the antenna 18, thus the flexibility in the design is increased, and antennas can be disposed with interference between each antenna suppressed.

Although an embodiment of this disclosure has been described on the basis of various drawings and examples, it is to be noted that a variety of modifications and changes are easily made by a person skilled in the art on the basis of this disclosure. Accordingly, it is to be understood that such modifications and changes are included in the scope of this disclosure.

REFERENCE SIGNS LIST

10 Electronic device
11 Display
12 Sheet metal member
12A External part
12B Internal part
13 Substrate
14 Battery
15 Case back (case)
16 Rear panel
17 Antenna (first antenna)
18 Antenna (second antenna)
121, 121A, 121B Notch

The invention claimed is:

1. An electronic device comprising:
   a first antenna disposed on a case provided at a back side of the electronic device;
   a display provided at a front side of the electronic device; and
   a sheet metal member that is provided at the front side of the electronic device and is configured to protect the display, wherein
   a notch extending in a specific direction is provided in the sheet metal member;
   the sheet metal member is divided, in a direction intersecting with the specific direction, into an external part of the notch and an internal part of the notch by the notch; and
   the external part functions as a second antenna.

2. The electronic device according to claim 1, wherein
   the sheet metal member has a first surface being in parallel with a display surface of the display and a second surface bent from the first surface toward the display; and
   the notch is provided such that an external part of the sheet metal member functioned as the second antenna is provided on the second surface.

3. The electronic device according to claim 1, wherein
   the first antenna disposed on an outer surface of a case back of the case provided at the back side of the electronic device,
   the case back is storing the display in an internal space of the case back, and
   the sheet metal member is provided in contact with or adjacent to the display at the front side of the electronic device.

* * * * *